No. 842,618. PATENTED JAN. 29, 1907.
R. A. BRIGHT & A. W. DAVIS.
CIGAR BUNCHING MACHINE.
APPLICATION FILED MAR. 22, 1906.

7 SHEETS—SHEET 1.

WITNESSES
A.G. Pieczentkowski.
James T. Poole.

INVENTORS
Richard A. Bright
and Arthur W. Davis
Horatio E. Bellows.
BY
ATTORNEY

No. 842,618. PATENTED JAN. 29, 1907.
R. A. BRIGHT & A. W. DAVIS.
CIGAR BUNCHING MACHINE.
APPLICATION FILED MAR. 22, 1906.

7 SHEETS—SHEET 6.

WITNESSES.
A.G. Pieczentkowski.
James T. Toole.

INVENTORS.
Richard A. Bright
and Arthur W. Davis
By Horatio E. Bellows
ATTORNEY.

No. 842,618. PATENTED JAN. 29, 1907.
R. A. BRIGHT & A. W. DAVIS.
CIGAR BUNCHING MACHINE.
APPLICATION FILED MAR. 22, 1906.

7 SHEETS—SHEET 7.

WITNESSES.
A.G. Pieczentkowski.
James T. Toole.

INVENTORS.
Richard A. Bright
and Arthur W. Davis
BY Horatio E. Bellows
ATTORNEY

UNITED STATES PATENT OFFICE.

RICHARD A. BRIGHT AND ARTHUR W. DAVIS, OF CRANSTON, RHODE ISLAND.

CIGAR-BUNCHING MACHINE.

No. 842,618.　　　　Specification of Letters Patent.　　　　Patented Jan. 29, 1907.

Application filed March 22, 1906. Serial No. 307,524.

*To all whom it may concern:*

Be it known that we, RICHARD A. BRIGHT and ARTHUR W. DAVIS, both citizens of the United States, residing at Cranston, in the county of Providence and State of Rhode Island, have invented certain new and useful Improvements in Cigar-Bunching Machines, of which the following is a specification, reference being had therein to the accompanying drawings.

Our invention relates to machines for bunching and applying the binder to cigar-filler tobacco, and has for its object the ends commonly sought in this class of machinery, but more particularly to provide a compact mechanism capable of great speed and having the capacity of forming a homogeneous bunch in any desired variety of form and from any variety of filler.

Our invention consists, essentially, in the improved feeding mechanism and in the novel construction and operation of the binding-rolls.

Further novelty resides in the peculiar construction and combination of mechanical parts coacting with and auxiliary to the feeding and binding mechanism.

Figure 1:
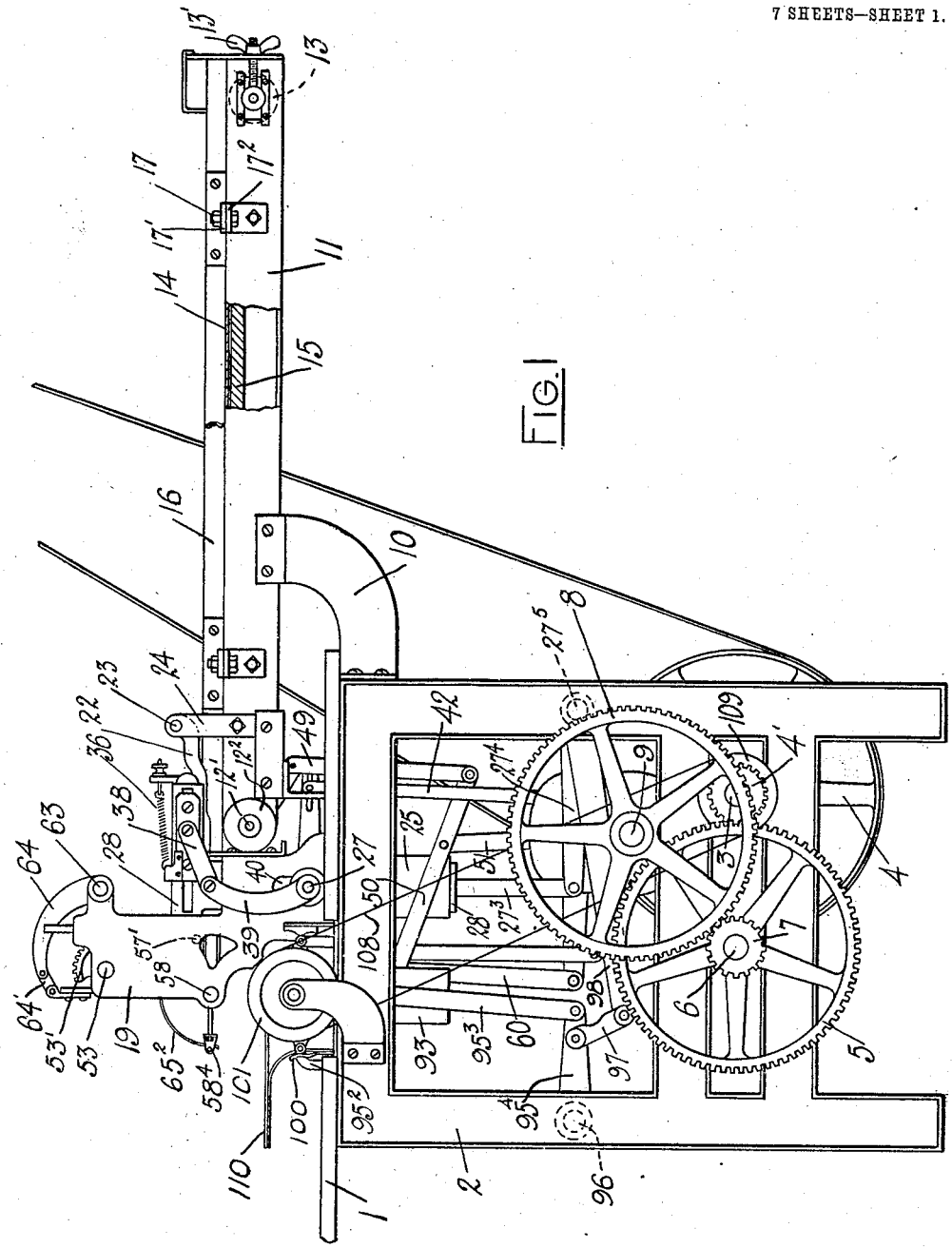
Figure 2:
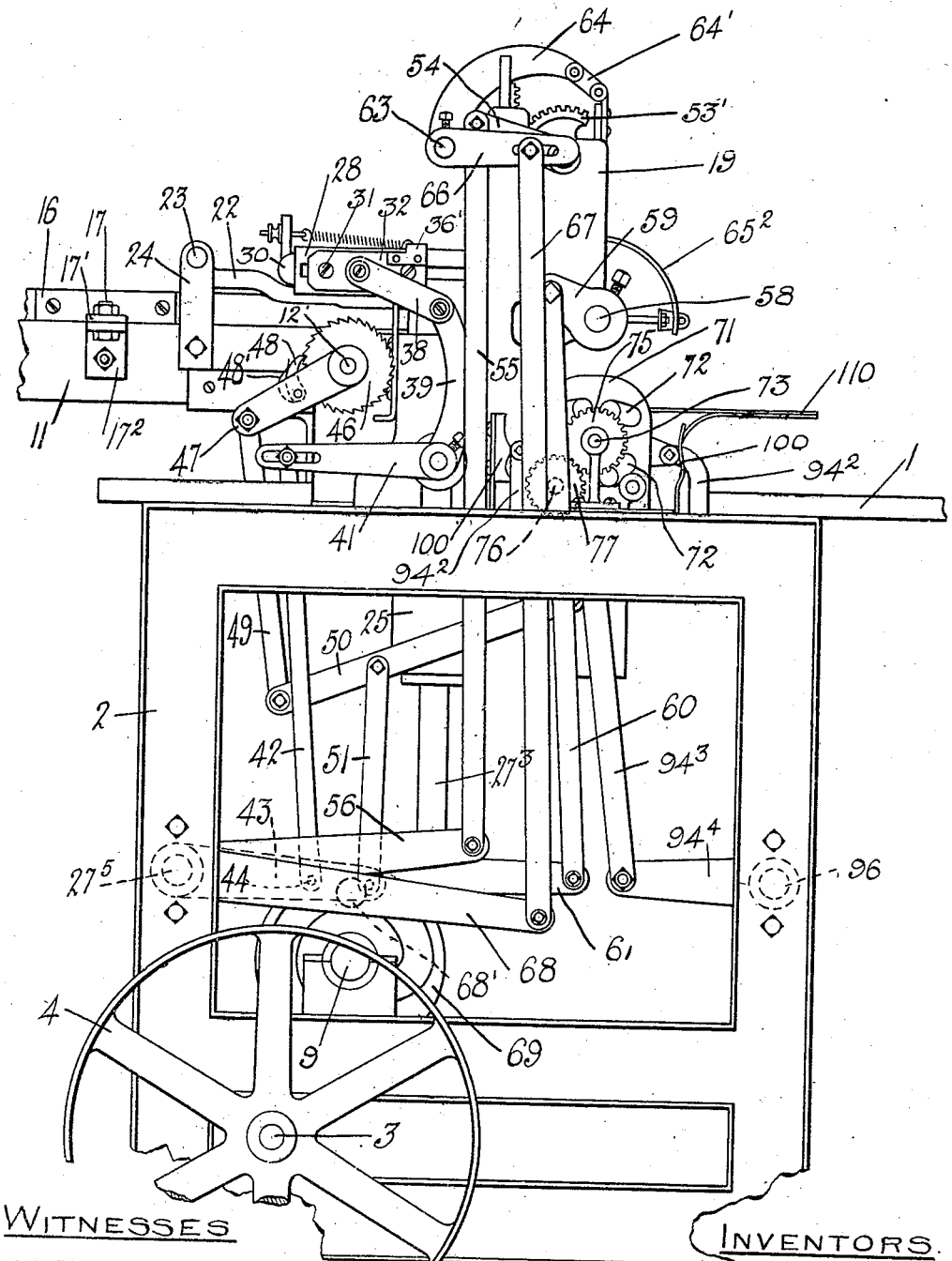
Figure 3:
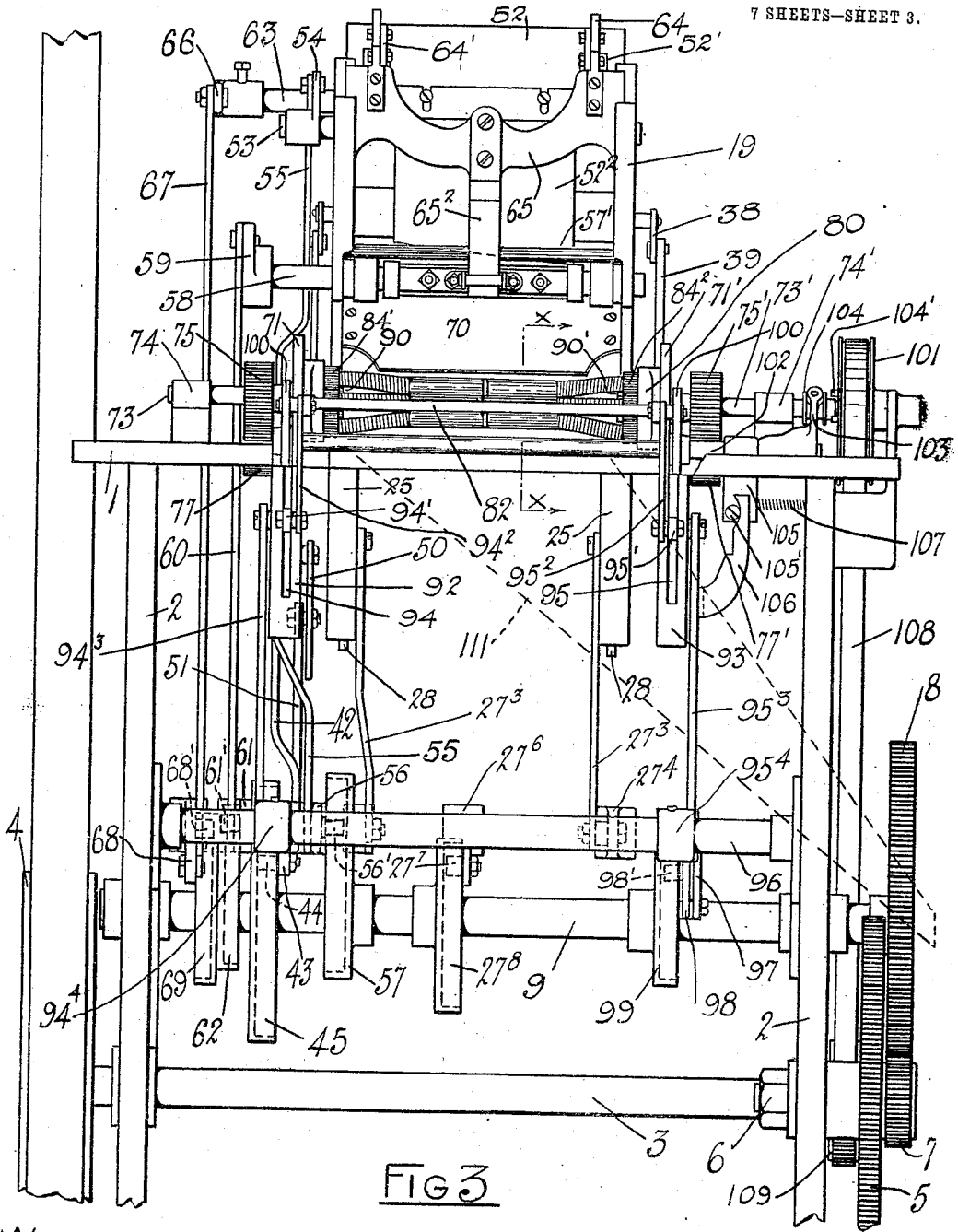
Figure 4:
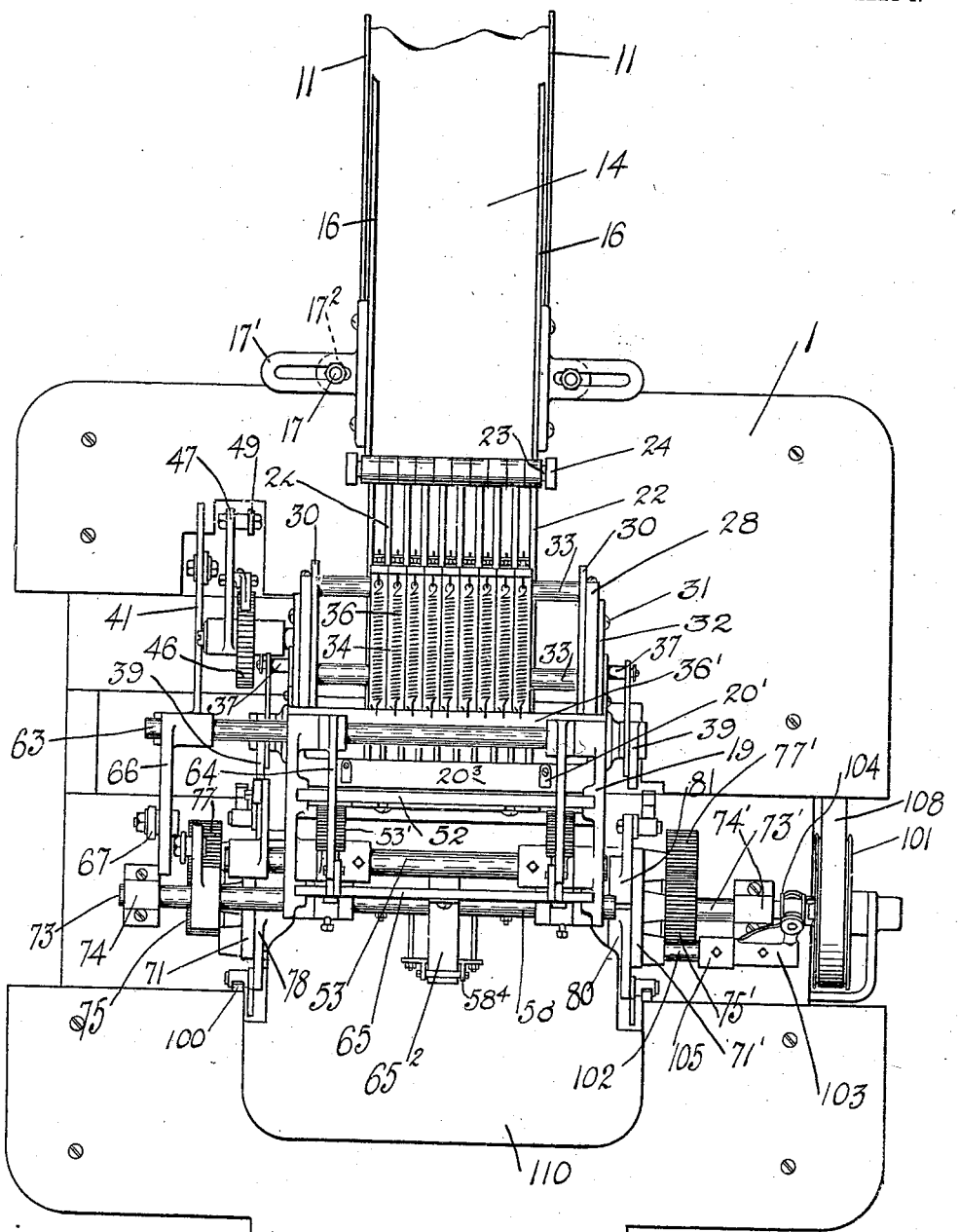
Figure 5:
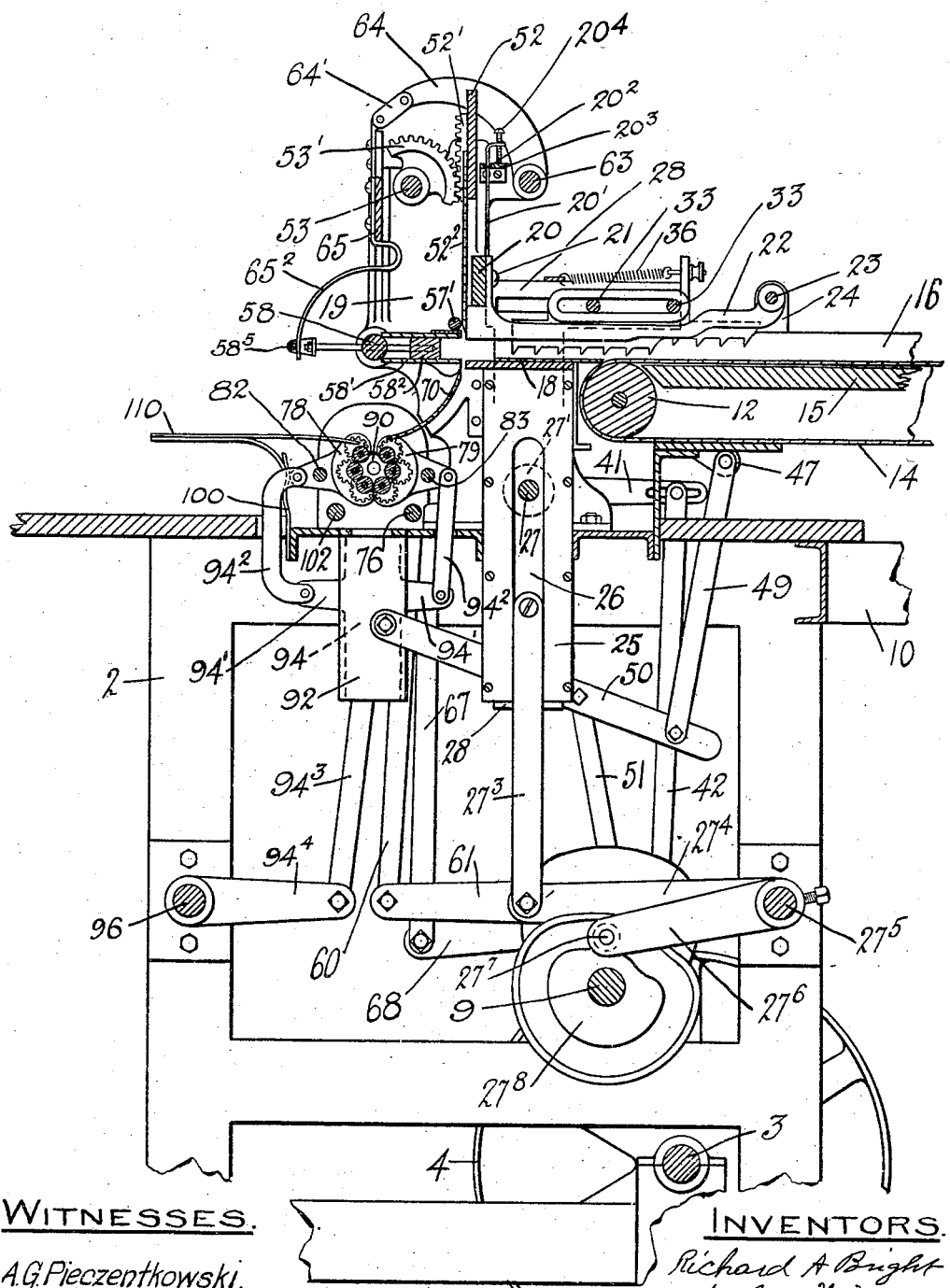
Figure 6:
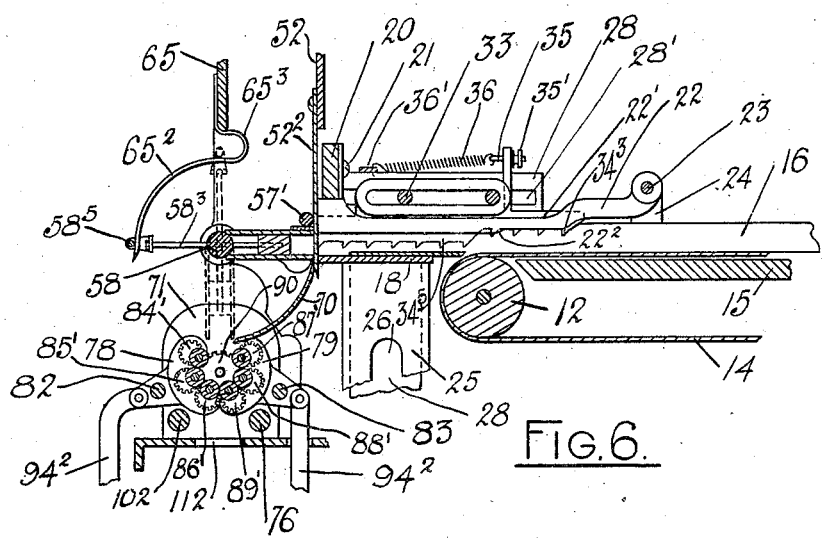
Figure 7:
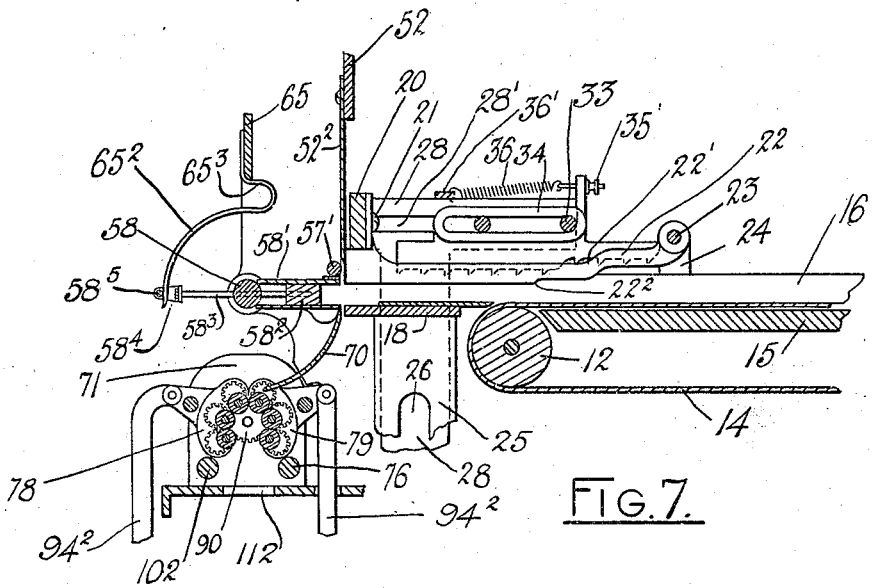
Figure 8:
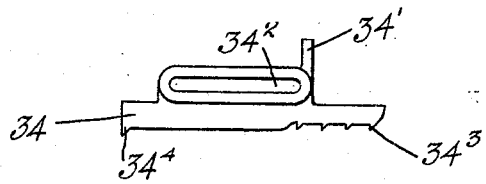
Figure 9:
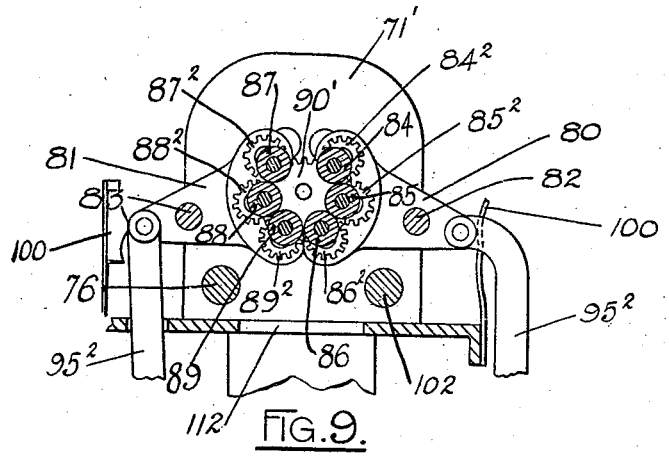
Figure 10:
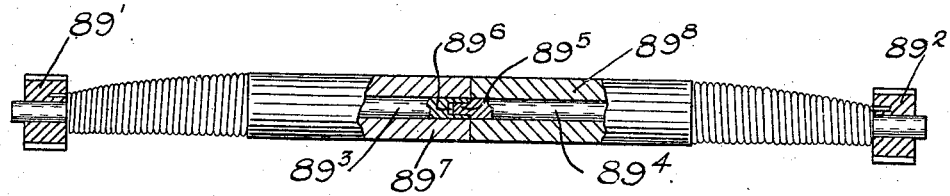

In the drawings, wherein like reference characters indicate like parts, Figure 1 is a side elevation of a complete machine embodying our invention; Fig. 2, an elevation of the opposite side of the same with a portion of the feed-trough broken away; Fig. 3, a front elevation of the machine with the ironing-plate removed; Fig. 4, a plan view with a part of the trough broken away; Fig. 5, a longitudinal central section of the same. Fig. 6 is a like section of the carrier-rolls and adjacent parts, showing the rolls in receiving position; Fig. 7, the same showing the rolls in discharging position; Fig. 8, a side view of a feeding-bar; Fig. 9, section on line $x\ x$ of Fig. 3; Fig. 10, longitudinal section, partly in elevation, of one of the forming-rolls; and Fig. 11, a modified form of roll.

Like reference-numerals indicate like parts throughout the views.

The machine selected to embody the invention comprises a bed 1, supported by a frame 2, in which is mounted a driving-shaft 3, actuated by a pulley 4 and carrying a gear 4', which meshes with a toothed wheel 5, mounted upon a stud 6 in the frame. On the wheel 5 is a gear 7, engaging a toothed wheel 8, fixed to cam-shaft 9. The cam-shaft may be driven, if desired, directly from the driving-shaft. The shaft 9 actuates the various mechanisms for feeding, conveying, and forming and binding.

The feed-trough is supported by arms 10 upon the back of the machine-frame and comprises walls 11, carrying the usual rollers 12 and 13. The latter is an idler adjustable longitudinally in the walls by screws 13'. The feed-belt 14, carried by the rollers, rests upon a board 15 in the trough. Upon each wall 11 is a guard-rail 16, transversely adjustable by screws 17 in lugs 17' and $17^2$ upon the rails and walls, respectively. In alinement with the belt 14 is a receiving plate or table 18, fixed in the uprights 19 of the frame. Vertically adjustable in the uprights is a transverse bar 20, to which is fixed by screws 21 the inner ends of a series of interspaced flat bars 22 22, whose opposite ends are fixed to a cross-bar 23, supported on lugs 24 upon the trough-walls. This bar series forms a fixed guiding-grate, whose lower surface is slightly inclined and provided with a double swell 22' and $22^2$. The inclination and swells regulate the density of the filler-sheet during its advance toward the knife. The thickness of the filler-sheet is further governed by adjusting the bar 20, which has two vertical slides or strips 20', which traverse openings $20^2$ in a plate $20^3$, fixed to the uprights. The bent ends of the slides carry adjusting-screws $20^4$, which rest upon the plate $20^3$.

An important auxiliary device for advancing the filler-sheet is a carriage or frame comprising guides 25 with oblong openings 26 to permit the passage of a shaft 27. Extensions or guides 28 upon these sides have horizontal slots 28'. Sliding plates 30 upon the inner faces of the guide-plate are joined by screws 31, traversing slots 28', with companion sliding plates 32 upon the opposite sides of the guide-plate. The plates 30 are connected by two transverse bars 33. The described carriage is reciprocated by the shaft 27, which is mounted in vertically-slidable blocks 27', moving in guides 25 upon the machine-frame. Pivoted to each block is a connecting-rod $27^3$, connected to a lever $27^4$, fixed to a rock-shaft $27^5$, mounted in the machine-frame. The shaft $27^5$ is oscillated through its arm $27^6$, whose end carries a stud $27^7$, traveling in a channeled cam $27^8$, fixed to cam-shaft 9. Loosely mounted upon the transverse bars 33 of the carriage and sliding in the spaces intermediate the bars 22 22 are a series of flat, serrated, or toothed feeding-bars 34 34, each of which has, as shown in Fig. 8, a post $34'$ and a slot $34^2$, which permits longitudinal movement upon the bars 33, which pass therethrough. Each of the bars 34 has teeth upon a portion of its lower margin. The rear marginal portion of the bar is in a higher plane than its forward portion. Each alternate bar of this series has teeth $34^3$ upon the higher or rear margin and one or two teeth $34^4$ upon its opposite margin. The other bars of the series have teeth $34^3$ throughout their forward lower margin in addition to the teeth $34^3$ on their rear margins, as shown in Fig. 6. Traversing each bar-post is a threaded pin 35, provided with an adjusting-nut $35'$. To the pin is attached a retractile spring 36, whose opposite end is fixed to a transverse strip $36'$, connecting the sliding plates 32. On the plates 32 are studs 37, connected by links 38 to the ends of levers 39, fixed to the shaft 27, moving in slots 40 of the standards 19. Upon one end of the shaft 27, as shown in Fig. 2, is fixed an arm 41, connected by a rod 42 to an intermediate portion of the lever 43, loosely mounted on the rock-shaft $27^5$. The lever 43 is provided with a stud 44, traveling in the channel of a heart-shaped cam 45. The rotation of this cam and the rock-shaft $27^5$ combine to impart to the feeding-carriage and its bars 34 a reciprocating movement longitudinally and vertically or in a nearly rectangular path in a vertical plane. In Fig. 7 the carriage is shown elevated at the extreme of its rearward travel. It first descends and travels forward in a plane parallel with and slightly above the receiving-table 18, as shown in Fig. 6. It next rises to elevated position preparatory to repeating its rearward reciprocation. During the forward travel of the carriage the teeth of the feeding-bars 34 project below the horizontal plane of the grate-bars 22 22.

The feeding-belt 14 is actuated by the roller 12, mounted on a shaft $12'$, journaled in circular plates $12^2$, fixed in the feed-trough walls. Fixed to the shaft $12'$, as shown in Fig. 2, is a ratchet 46 and an arm 47, carrying a pawl 48. The latter is pressed by a spring $48'$ into engagement with the teeth of the ratchet. A rod 49 connects the end of the arm 47 to one end of a bar 50, pivoted intermediate its length to the upper end of a bar 51, whose lower end is pivoted to the lever 43, which intermittently rotates the roller 12, advancing the belt 14 synchronously with the advance of the feeding-rack. The filler-sheet in the trough is thus intermittently advanced.

For separating each charge from the filler-sheet a knife 52 is slidably mounted in the uprights 19. The knife is provided with rack-teeth $52'$ $52'$ and a blade $52^2$, whose cutting edge slides slightly below the plane of the receiving-table 18, as shown in Fig. 6. Mounted in the uprights adjacent the knife is a shaft 53, to which are fixed toothed segments $53'$, engaging the rack-teeth $52'$. Upon the end of shaft 53 is an arm 54, connected to the upper end of a connecting-rod 55, whose lower end is pivoted to a cam-lever 56, loosely mounted on the rock-shaft $27^5$. On lever 56 is a stud $56'$, traveling in the channel of a cam 57, mounted on the cam-shaft 9. By this cam the segments $53'$ vertically reciprocate the blade $52^2$, which is timed to descend at the close of each advance of the belt 14 and feed-rack. A transverse bar $57'$, mounted in the uprights contiguous with the blade $52^2$, assists to retain the latter in shearing contact with the margin of the feeding plate or table 18.

The mechanism for receiving the charge from the table and conveying it to the binding or forming rolls includes a shaft 58, mounted in the uprights 19, to which is fixed a conveyer comprising an oblong box $58'$ with an open top and bottom, containing a slidable block $58^2$, in which is fixed the ends of a yoke $58^3$, which slide through diametrical passages in the shaft 58. The yoke-head is provided with a transverse opening $58^4$, one side of which is formed by a bar or friction-roller $58^5$. The box $58'$ oscillates in a quarter-circle from the feeding-table, where it receives the filler charge, to discharging position and return, as shown in Fig. 6. This movement is imparted through shaft 58, which is provided with an arm 59, pivoted to a connecting-rod 60, attached to the end of a cam-lever 61, loosely mounted on the rock-shaft $27^5$ and carrying a stud $61'$, which travels in a channeled cam 62 on the cam-shaft 9. The conveyer-discharging mechanism comprises a shaft 63, journaled in the uprights, to which is fixed two arched arms 64 64, connected by links $64'$ $64'$ to a slide 65, moving in vertical guides $65'$ in the uprights. Fixed to the slide is a projecting curved guide-bar $65^2$, provided with a transverse loop $65^3$, (best shown in Fig. 6,) which bar is adapted to traverse the opening $58^4$ in the discharge-yoke $58^3$. The curved guide-bar $65^2$ is vertically reciprocated as follows: The shaft 63 is provided with an arm 66, to which is pivoted a connecting-rod 67, connected with the end of a cam-lever 68, loosely mounted on the rock-shaft $27^5$ and having an intermediate stud $68'$, traveling in a cam 69, mounted on cam-shaft 9. The downward thrust of the slide 65 through the described connections occurs after the yoke 58 has reached a vertical position in alinement with the slide 65, (shown in broken lines in Fig. 6,) whereby the discharge-block $58^2$ is downwardly impelled to expel its filler charge into the forming-chamber. A curved guard-plate 70 in the uprights retains the charge in the conveyer during the latter's downward travel.

Figure 11:
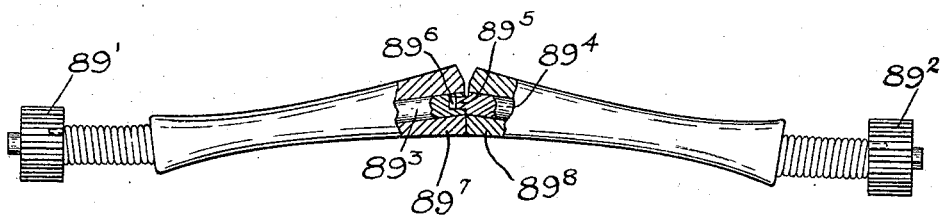

Referring to forming or binding chamber, the front of the machine-frame is provided with bearing-plates 71 71', each having four segmental slots 72 72', the plate 71 forming one bearing of the shaft 73, whose end is journaled in the standard 74 upon the machine-frame, and the plate 71' forming a bearing for the driving-shaft 73', journaled in a second support 74'. To the respective shafts are fixed gears 75 and 75'. Motion is communicated from the shaft 73' to the shaft 73 through a shaft 76, mounted in the bearing-plates 71 71', one of whose ends carries a gear 77, meshing with the gear 75, and whose other end has a gear 77', engaging the gear 75'. Sliding along the inner faces of the bearing-plates are crescent-shaped opening and closing jaw-couplets 78 79 and 80 81, connected, respectively, in couplets by rods 82 and 83. Mounted in the jaws 78 and 80 are three forming-rolls 84, 85, and 86 and in jaws 79 and 81 the rolls 87 88 89. Upon the rolls adjacent each end are the pinions 84' $84^2$ 85' $85^2$, &c., respectively. In structural detail the rolls are similar. As shown in Fig. 10, the roll comprises a two-part core whose sections $89^3$ and $89^4$ are detachably interlocked by an end projection $89^5$ on section $89^4$, registering in a cavity $89^6$ in the end of section $89^3$. The particular form of interlocking, however, is not exclusive. Each section of the core, which is rigid, is preferably bent intermediate its length. Mounted loosely upon the sections $89^3$ and $89^4$, respectively, and with their inner ends abutting are two tubes $89^7$ and $89^8$. The outer surfaces of the tubes are longitudinally corrugated or otherwise roughened. Soldered to outer end of tube $89^7$ is a flexible spirally-wound sleeve or connection attached to the pinion 89'. A similar flexible connection or sleeve is soldered to the outer end of the tube $89^8$ and fixed to the pinion $89^2$. The roll shown in Fig. 10 is arranged to roll a cigar-bunch having a uniform body diameter; but when a perfecto shape is desired each core is inclined in relation to the other, as shown in Fig. 11, and the peripheries of the tubes are somewhat concaved longitudinally. Upon the inner ends of shafts 73 and 73' are gears 90 and 90', respectively. The gear 90 meshes with and drives the pinions 84', 85', 86', 87', 88', and 89', and the gear 90' drives the pinions $84^2$, $85^2$, $86^2$, $87^2$, $88^2$, and $89^2$.

The opening and closing jaws oscillate from receiving to discharging position, as shown in Figs. 6 and 7, by virtue of the following connections. (Best seen in Fig. 5.) Guides 92 and 93 in the frame carry slides 94 and 95. The slides have, respectively, lateral lugs 94' and 95'. The lugs 94' are connected with the jaws 78 and 79 by links $94^2$, and lugs 95' are connected to jaws 80 and 81 by links $95^2$. Connecting-rods $94^3$ and $95^3$ join the slides 94 and 95, respectively, with the levers $94^4$ and $95^4$, fixed to a rock-shaft 96 in the frame. One end of the rod 50 above referred to is pivoted to the guide 92. The rock-shaft 96 is oscillated by means of a link 97, connecting the lever $95^4$ with the end of a lever 98, pivoted to shaft $27^5$ and provided with a stud 98', traveling in a channeled cam 99. The jaw-couplets are normally pressed toward each other by springs 100, bearing against their margins.

It is desirable that the forming-rolls should be inactive during the interval between their delivery of one bunch and the insertion of another charge. For attaining this end the shaft 93', which drives the forming or binding mechanism, is provided with a loose driving-pulley 101, which is intermittently thrown into operation by the following clutch mechanism: A longitudinally-slidable bar 102 is mounted in the bed of the machine, as shown in Fig. 3, to which is fixed an arm 103, engaging a collar 104, slidable on but rotatable with the shaft 93 and adapted at the extreme of its outward travel to engage lugs 104' upon the face of pulley 101. Loosely mounted on the bar 102 is a depressing-plate 105, carrying a stud 105', contacting with the irregular edge of a bar 106, fixed to the connecting-rod $95^3$, by which it is reciprocated, to throw the collar in and out of engagement with the pulley 101. The stud 105 is pressed against the face of the bar 106 by a retractile spring 107, connecting the plate 105 with the machine-frame. The pulley or wheel 101 is driven through a belt 108 by a wheel 109, fixed to shaft 3. The ironing table or plate 110 is mounted upon the machine-bed adjacent and in the plane of the upper forming-rolls, and the delivery-chuck 111 (shown in broken lines in Fig. 3) is fixed to the bed below the rolls and leads from an opening 112 in the bed.

From the foregoing description it will be observed that the filler material is spread in the form of a sheet upon the belt 14 in the feeding-trough, where it is intermittently advanced toward the grate, the swelled and inclined lower portions of whose bars 22 serve to smooth and gradually lessen the thickness of the sheet as it progresses. Simultaneously with the advance of the feed-belt the rack through its toothed bars 34 engages the filler-sheet and advances the same the distance of a carrier-charge into the carrier-box 58′, the teeth being in a continuous transverse series serving to advance the whole breadth of the filler-charge at one time, thereby preventing all torsion of its constituents parts. Furthermore, the yielding possibilities of any one or more of the toothed bars by virtue of the springs 36 prevents any derangement of the advancing filler occasioned by the presence of any obstructing bunch. At the close of each advance of the sheet the blade of knife 52 descends and cleanly severs the carrier-charge, whereupon the carrier swings from its horizontal to vertical or discharging position above the forming-rollers 84 and 87, which at that instant are distended to receive the charge expelled by the sliding block 58². Meanwhile the operator feeds the bunch-binder along the ironing-table 110, the roll 84, and into the forming-chamber intermediate the two sets of rolls, which simultaneously forms and applies the binder to the bunch.

Having described our invention, what we claim is—

1. In a machine of the type set forth, the combination with a filler-feeding belt, of a series of interspaced bars fixed at an inclination to and above the plane of the belt, serrated bars sliding intermediate the bars, and means for simultaneously actuating the feeding-belt and serrated bars.

2. In a machine of the type set forth, the combination with a filler-feeding belt, of a series of bars provided with swells upon their lower margins fixed above the plane of the belt, filler-engaging means sliding between the bars, and means for synchronously actuating the belt and engaging means.

3. In a machine of the type set forth, the combination with a filler-feeding belt, of a series of bars provided with inclined swelled lower margins fixed above the plane of the belt, filler-engaging devices sliding between the bars and means for simultaneously actuating the belt and engaging devices.

4. In a machine of the type set forth, the combination with a filler-feeding belt, of a series of bars fixed above the belt, slidable serrated bars intermediate the fixed bars adapted to engage the filler, and means for simultaneously actuating the belt and sliding the serrated bars.

5. In a machine of the type set forth, the combination with a filler-feeding belt, of a series of fixed bars having their lower margins inclined to the plane of the belt, slidable toothed bars provided with swelled lower margins intermediate the fixed bars adapted to engage the filler, and means for actuating the belt and sliding the toothed bars.

6. In a machine of the type set forth, the combination with a filler-feeding belt, of a series of bars fixed above the belt, reciprocating serrated bars intermediate the fixed bars for engaging and advancing the filler, yielding means upon the serrated bars for normally retaining the serrations of each bar in alinement during their advance, and means actuating the belt and reciprocating the toothed bars.

7. In a machine of the type set forth, the combination with a filler-feeding belt, of a filler-table adjacent the belt, a grate fixed in the plane above the belt and table, interspaced bars fixed in the grate, a carriage reciprocating adjacent the grate, bars mounted in the carriage adapted to slide in the spaces between the fixed bars and provided with teeth adapted to engage the filler and means for reciprocating the carriage.

8. In a machine of the type set forth, the combination with a frame, filler-table, and feeding-belt, of a grate fixed to the frame above the table and belt, and in a plane substantially parallel to that of the table and belt interspaced bars fixed in the grate, a carriage slidably mounted in the frame toothed bars mounted in the carriage and adapted to register in the spaces between the grate-bars, means in the frame for longitudinally reciprocating the carriage, and means in the frame coacting with the first-named means for reciprocating the carriage toward and from the plane of the table.

9. In a machine of the type set forth, the combination with two sets of forming-rolls, each roll comprising interengaging sections, stationary non-flexible cores in the sections, sleeves rotatably mounted on the cores, and mechanism for rotating the sleeves.

10. A roll for forming cigar-bunches comprising a rigid jointed core, a jointed tube loosely mounted upon the core intermediate the ends of the core, and means upon the core connected with the tube for rotating the sleeve.

11. A roll for forming cigar-bunches comprising a rigid jointed core, a jointed tube loosely mounted upon the core intermediate the core ends, pinions loosely mounted upon the ends of the core, and flexible sleeves connecting the tube and pinions.

12. A roll for forming cigar-bunches, comprising a rigid jointed core, a jointed tube provided with longitudinal corrugations loosely mounted upon the core intermediate the core ends, pinions loosely mounted upon the ends of the core, and sleeves connecting the tube and pinions.

13. A roll for forming cigar-bunches comprising a jointed core, a jointed tube having a longitudinally-concaved exterior mounted upon the core intermediate the core ends, pinions loosely mounted upon the ends of the core, and connections between the pinions and the tube.

14. In a machine of the type set forth the combination with two pairs of jaw-couplets adapted to rock toward and from each other, a plurality of rolls mounted in each jaw-couplet, pinions on the rolls, a driving-shaft adjacent the rolls, and a gear on the driving-shaft adapted to mesh with the pinions when the jaws are in closed position, of a clutch upon the driving-shaft, means for rocking the jaws, and means actuated by the rocking means for intermittently operating the clutch.

In testimony whereof we have affixed our signatures in presence of two witnesses.

RICHARD A. BRIGHT.
    ARTHUR W. DAVIS.

Witnesses:
 HORATIO E. BELLOWS,
 FRED I. COZZENS.